(12) United States Patent
Kim (10) Patent No.: US 9,182,871 B2
(45) Date of Patent: Nov. 10, 2015

(54) METHOD AND APPARATUS FOR CONTROLLING TOUCH INPUT OF TERMINAL

(71) Applicant: Samsung Electronics Co. Ltd., Suwon-si, Gyeonggi-do (KR)

(72) Inventor: Youngjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 13/895,645

(22) Filed: May 16, 2013

(65) Prior Publication Data

US 2013/0328805 A1 Dec. 12, 2013

(30) Foreign Application Priority Data

Jun. 11, 2012 (KR) ........................ 10-2012-0062050

(51) Int. Cl.

| G06F 3/041 | (2006.01) |
|---|---|
| G06F 3/046 | (2006.01) |
| G06F 3/0488 | (2013.01) |
| G06F 3/0354 | (2013.01) |

(52) U.S. Cl.
CPC ............ *G06F 3/046* (2013.01); *G06F 3/03545* (2013.01); *G06F 3/041* (2013.01); *G06F 3/0416* (2013.01); *G06F 3/0488* (2013.01)

(58) Field of Classification Search
None
See application file for complete search history.

(56) References Cited

U.S. PATENT DOCUMENTS

| 8,018,440 | B2 * | 9/2011 | Townsend et al. ............ 345/173 |
|---|---|---|---|
| 2003/0080946 | A1 | 5/2003 | Chuang |
| 2004/0001048 | A1 | 1/2004 | Kraus et al. |
| 2004/0104899 | A1 | 6/2004 | Hong et al. |
| 2004/0105040 | A1 | 6/2004 | Oh et al. |
| 2007/0198950 | A1 * | 8/2007 | Dodge et al. .................. 715/815 |
| 2010/0220062 | A1 * | 9/2010 | Antila ............. 345/173 |
| 2011/0025628 | A1 * | 2/2011 | Lin et al. ....................... 345/173 |
| 2013/0300672 | A1 * | 11/2013 | Griffin .......................... 345/173 |

FOREIGN PATENT DOCUMENTS

KR 10-2010-0136578 A 12/2010

* cited by examiner

*Primary Examiner* — Nicholas Lee
(74) *Attorney, Agent, or Firm* — Jefferson IP Law, LLP (57) ABSTRACT

A method of controlling a touch input of a terminal is provided. The method includes determining, when a touch input is sensed, a touch position, and setting a partial area of a touch panel including the determined touch position as an effective touch area of the touch panel. The method may further include determining, when the touch input is sensed, whether the touch input is a pen touch input, and sensing the touch input through a touch panel for sensing a user touch and an Electro Magnetic Resonance (EMR) panel for sensing the pen touch input, wherein the touch position is determined when the touch input is a pen touch sensed through the EMR panel.

11 Claims, 8 Drawing Sheets

METHOD AND APPARATUS FOR CONTROLLING TOUCH INPUT OF TERMINAL

PRIORITY

This application claims the benefit under 35 U.S.C. §119(a) of a Korean patent application filed on Jun. 11, 2012 in the Korean Intellectual Property Office and assigned Serial No. 10-2012-0062050, the entire disclosure of which is hereby incorporated by reference.

BACKGROUND OF THE INVENTION

1. Field of the Invention

The present invention relates to an apparatus and method for controlling a touch input of a terminal. More particularly, the present invention relates to an apparatus and method that can simultaneously process a pen input and a touch input in a device that can use a finger and a pen touch.

2. Description of the Related Art

In general, recent terminals include a touch panel and perform an operation control and a data input of the terminal through the touch panel. In this case, the touch panel generally uses a capacitive type or a resistive type that senses a user's finger touch. In this case, when inputting data using a device using the touch panel, a keypad (Korean alphabet, English, numeral) for inputting data is displayed, and when touching a character area on the keypad, a method of recognizing a touch position of a terminal and determining input data is used.

However, when using the touch panel, if the keypad is not used, a finger should be used and thus a character and a picture cannot be finely input. Therefore, devices using a pen for finely performing a cursive script input or a drawing input such as a line have been developed. For example, Electro Magnetic Resonance (EMR) technology of the Wacom company senses a pen input through a resonance between a Flexible Printed Circuit Board (FPCB) and an EMR exclusive pen by adding an EMR sensor pad under a Liquid Crystal Display (LCD). In the following description, the touch panel is a panel that senses a finger touch, and an EM panel is a panel that senses a pen touch.

When the two touch methods are simultaneously provided, an unintended interference may occur by a touch of a pen and a hand. That is, when a pen touch method through an EMR pen and a C-type (capacitive) touch method that senses a finger are used, an unintended touch input may occur by a touch of a hand that holds a pen.

Figure 1:
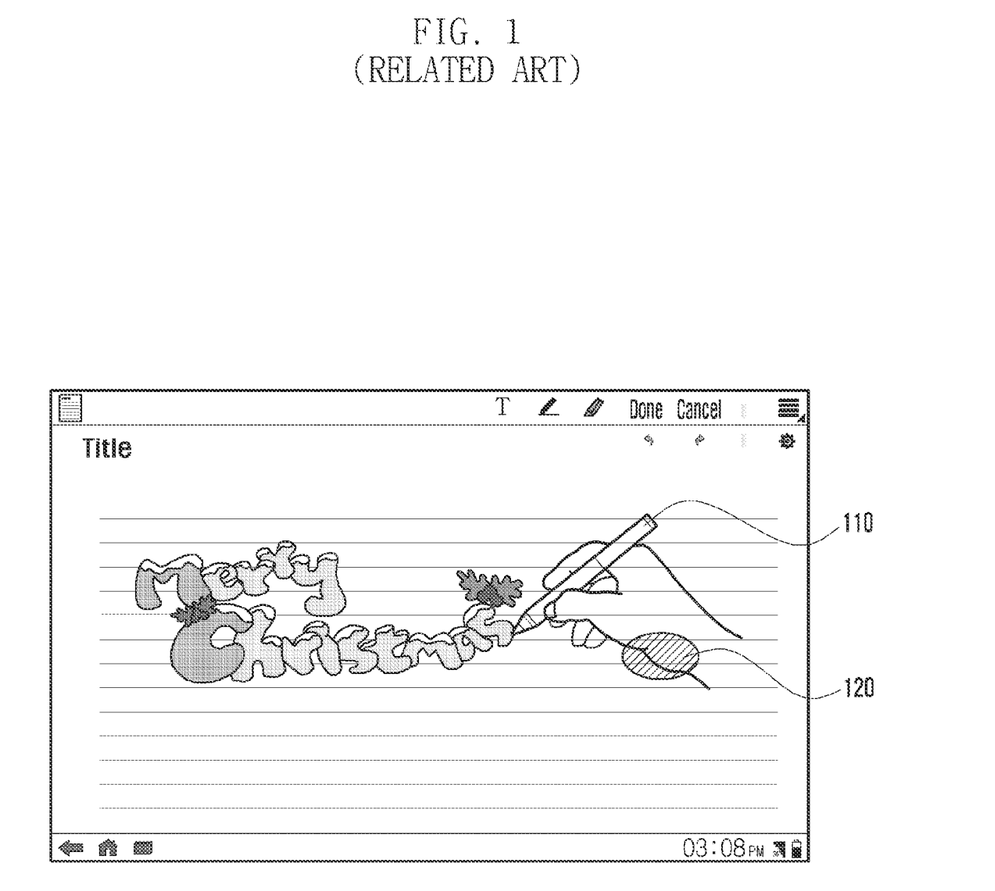
FIG. 1 is a diagram illustrating an unintended interference in a terminal using a touch input method according to the related art.

FIG. 1 is a diagram illustrating an unintended interference in a terminal using a touch input method according to the related art.

Referring to FIG. 1, when a user holds an EMR pen and performs an input action to a terminal, an unintended interference 120 is generated by a finger/palm holding a pen 110. Here, an input may be writing, drawing, a screen touch, and a gesture using a pen. In this case, when a meaningless touch input 120 generated by a hand holding the pen is sensed as an input, the terminal may perform an erroneous input or an erroneous operation. Further, in a terminal of the related art, when a pen input is performed, it is difficult to dispose an icon in a right/left lower end area, which is a portion in which a palm frequently contacts. That is, when a pen is used, an icon is randomly pressed, and thus a problem that an erroneous operation (conversion to another screen) occurs exists.

Therefore, there is a need for an improved apparatus and method for excluding an unintended touch input.

The above information is presented as background information only to assist with an understanding of the present disclosure. No determination has been made, and no assertion is made, as to whether any of the above might be applicable as prior art with regard to the present invention,

SUMMARY OF THE INVENTION

Aspects of the present invention are to address at least the above-mentioned problems and/or disadvantages and to provide at least the advantages described below. Accordingly, an aspect of the present invention is to provide an apparatus and method that can exclude an unintended touch input by setting an effective touch area of a touch panel and processing a touch input sensed in a touch panel area other than an effective touch area as an unintended touch input, when a pen input occurs in a terminal having a touch panel and an Electro Magnetic Resonance (EMR) panel.

Another aspect of the present invention is to provide an apparatus and method for sensing a pen input position and processing a pen input and a finger touch input by setting a predetermined area of the pen input position as an effective touch area of a touch panel, when a pen input is sensed.

Another aspect of the present invention is to provide an apparatus and method for sensing a pen input position when a pen input is sensed, determining a user's use pen type (left-handed person or right-handed person), setting an effective touch area of a touch panel in consideration of the user's use pen type at the pen input position, and processing a pen input and a finger touch input.

In accordance with an aspect of the present invention, a method of controlling a touch input of a terminal is provided. The method includes determining, when a touch input is sensed, a touch position, and setting a partial area of a touch panel including the determined touch position as an effective touch area of the touch panel.

In an exemplary implementation, the method may further include determining, when the touch input is sensed, whether the touch input is a pen touch input, and sensing the touch input through a touch panel for sensing a user touch and an EMR panel for sensing the pen touch input, wherein the touch position is determined when the touch input is a pen touch sensed through the EMR panel.

In accordance with another aspect of the present invention, an apparatus for controlling a touch input of a terminal is provided. The apparatus includes a touch panel for sensing a user' touch input, an EMR panel for sensing a pen touch input, a controller for determining a touch position when the touch input is sensed and for setting a partial area of the touch panel including the determined touch position as an effective touch area of the touch panel, and a display unit for displaying an operation state of the terminal by the control of the controller.

In an exemplary implementation, the touch input is a pen touch input sensed through the EMR panel, and the controller sets a partial area including the determined pen touch position as an effective touch area of the touch panel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to an apparatus and method that determine a specific area based on an Electro Magnetic Resonance (EMR) pen as an effective touch area of a touch panel when the pen is touched and that recognize a touch input that is input through the touch panel within only the determined effective touch area and that do not recognize a touch input of the remaining area in a terminal having a touch panel and an EMR panel. In this case, the effective touch area of the touch panel may be set by drawing a concentric circle based on a pen touch position and may be set in consideration of a user's pen use type (i.e., it is determined by whether a hand holding a pen is a right hand or a left hand).

Therefore, when a pen touch input occurs (or when an EMR sensor pad recognizes a pen by approaching a predetermined distance), a terminal according to an exemplary embodiment of the present invention is controlled to recognize only an area within a predetermined area corresponding to a pen touch position. In this case, an effective touch area that is set as a reference of the pen touch input may be set by a size of a device and a developer's intention, and in exemplary embodiments, an example determined according to a user's pen use type or a concentric circle of a predetermined radius from a pen touch input position is described.

In a terminal performing an operation according to an exemplary embodiment, a touch input panel may be a digital device having a Touch Screen Panel (TSP) in an upper portion of a display and having an EMR digitizer in a lower portion thereof, and the digital device may simultaneously provide a pen touch input and a finger touch input (e.g., capacitive touch input).

Figure 2:
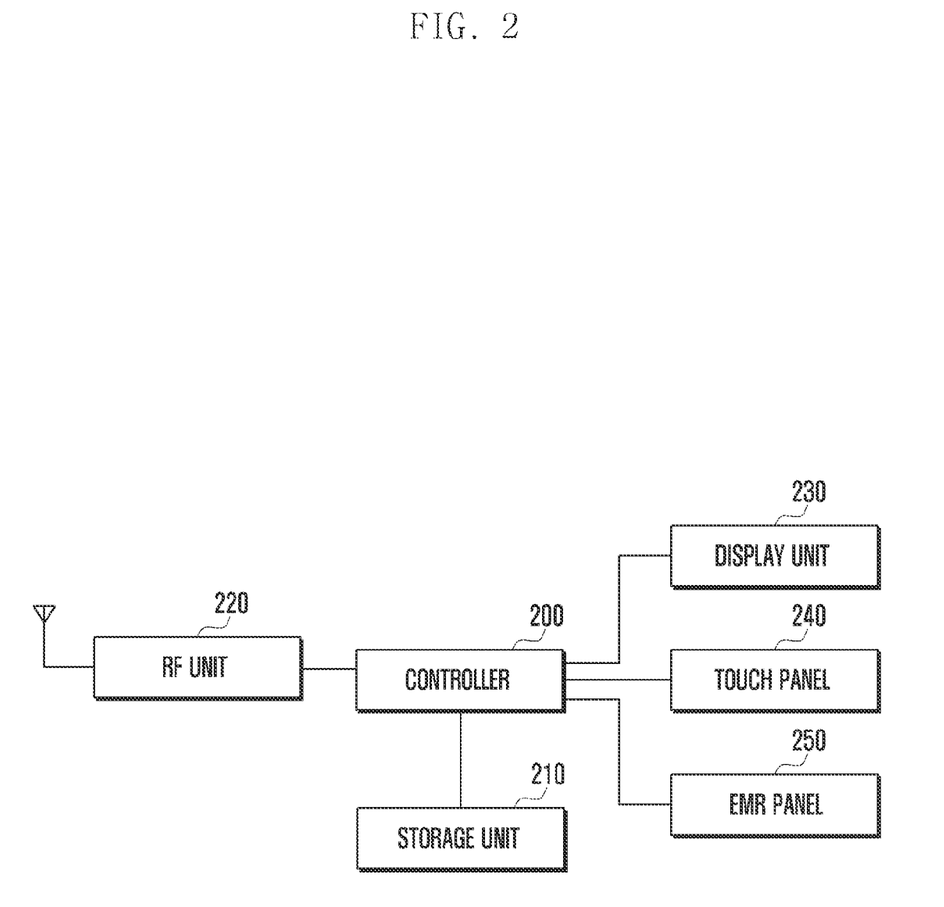
FIG. 2 is a block diagram illustrating a configuration of a terminal according to an exemplary embodiment of the present invention.

FIG. 2 is a block diagram illustrating a configuration of a terminal according to an exemplary embodiment of the present invention.

Here, the terminal is a mobile terminal and may be any of various digital devices such as a mobile phone including a smart phone, an MP3 terminal, a tablet PC, a computer, and the like.

Referring to FIG. 2, the terminal includes a controller 200, storage unit 210, Radio Frequency (RF) unit 220, display unit 230, touch panel 240, and EMR panel 250.

The RF unit 220 performs a wireless communication function with a base station or another apparatus. Here, the RF unit 220 includes a transmitter for up-converting a frequency of a signal to be transmitted and amplifying the signal and a receiver for down-converting a frequency of a received signal and low-noise amplifying the signal. Further, the RF unit 220 includes a modulation unit and a demodulation unit. Here, the modulation unit modulates a transmitting signal and outputs the signal to the transmitter, and the demodulation unit demodulates a signal received through the receiver. In this case, the modulation unit and the demodulation unit may be configured according to a Long Term Evolution (LTE) standard, a Wideband Code Division Multiple Access (WCDMA) standard, and a Global System for Mobile communications (GSM) standard, may be WI-FI or Wireless BROadband (WIBRO), and may be Near Field Communication (NFC) and Bluetooth. In the present exemplary embodiment, it is assumed that the RF unit 220 includes LTE, WIFI, and Bluetooth RF units.

The controller 200 controls general operations of a mobile terminal, and in the present exemplary embodiment, when an EMR pen is touched, the controller 200 determines a specific area as an effective touch area of a touch panel based on a pen and controls to recognize a touch input that is input through a touch panel only within the determined effective touch area and not to recognize a touch input of the remaining area. When the controller 200 sets an effective touch area of the touch panel, the controller 200 sets an effective touch area by drawing a concentric circle based on a pen touch position, and sets an effective touch area in consideration of a user's pen use type.

The storage unit 210 includes an operation program of the terminal, a program memory for storing a program according to the present exemplary embodiment, tables for operation of the terminal, and a data memory for storing data generated while performing the program.

The display unit 230 displays information of an application while executing under control of the controller 200. The display unit 230 may be an Liquid Crystal Display (LCD) or an Organic Light Emitting Diode (OLED). The touch panel 240 may be embodied with a capacitive type or a resistive type and outputs position information of a user's touch (hereinafter, a finger touch) to the controller 200. The EMR panel 250 includes an EMR sensor pad, senses a pen touch input through a resonance between a Flexible Printed Circuit Board (FPCB) and an EMR exclusive pen, and outputs the input to the controller 200. Here, the display unit 230, the touch panel 240, and the EMR panel 250 may be integrally formed.

In a mobile terminal having the above configuration, the controller 200 controls the display unit 230 to display information, and when a touch occurs at a specific position of the display unit 230, if the touch is a finger touch, the touch panel 240 outputs touch information to the controller 200. If the touch is a pen touch, the EMR panel 250 outputs pen touch information to the controller 200. In this case, the display unit 230, the touch panel 240, and the EMR panel 250 may be integrally formed, and in the present exemplary embodiment, it is assumed that the touch panel 240 is mounted in an upper portion of the display unit 230, and the EMR panel 250 is mounted in a lower portion of the display unit 230.

Figure 3A:
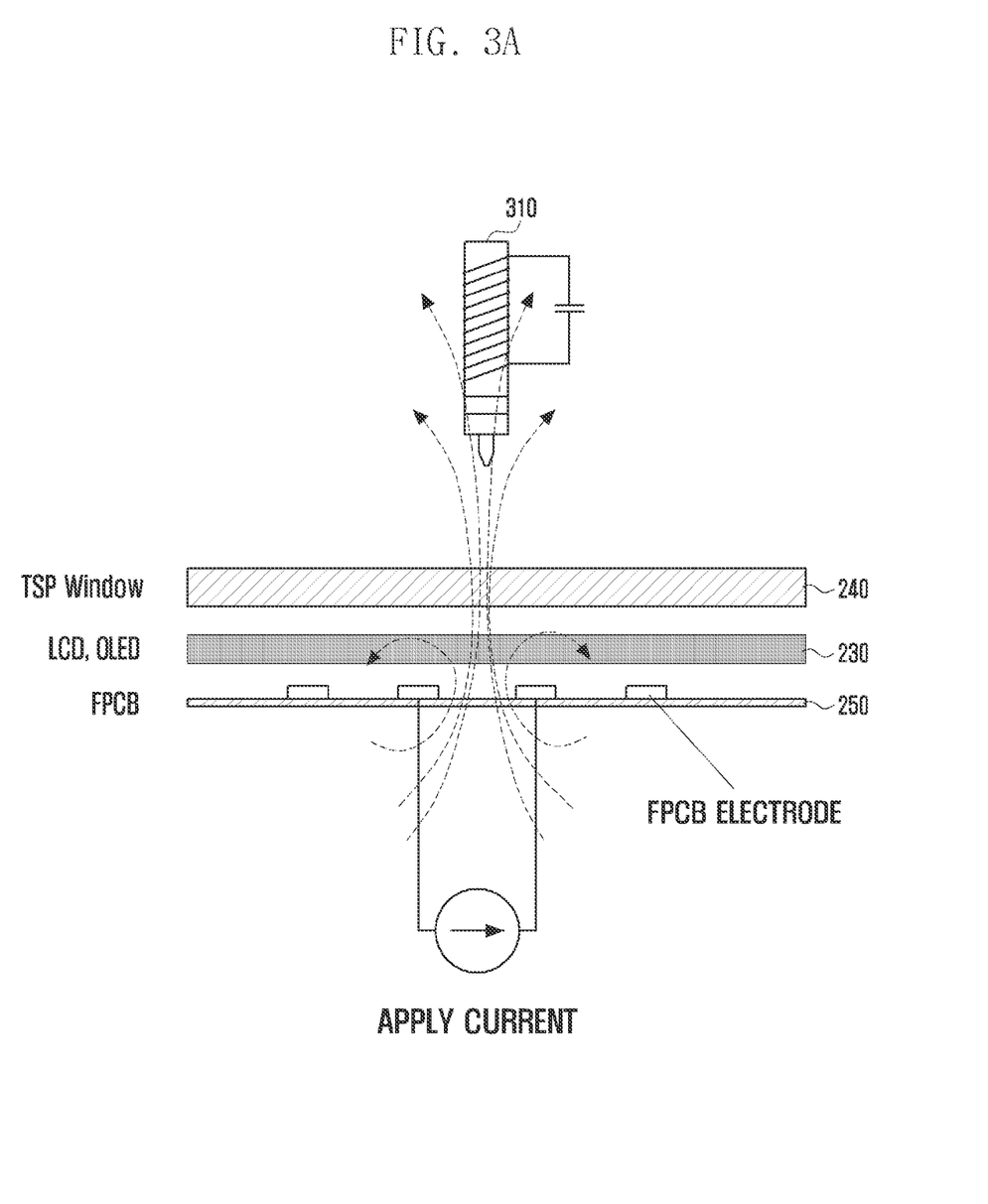
FIGS. 3A and 3B are diagrams illustrating operation of sensing a pen input according to an exemplary embodiment of the present invention.
Figure 3B:
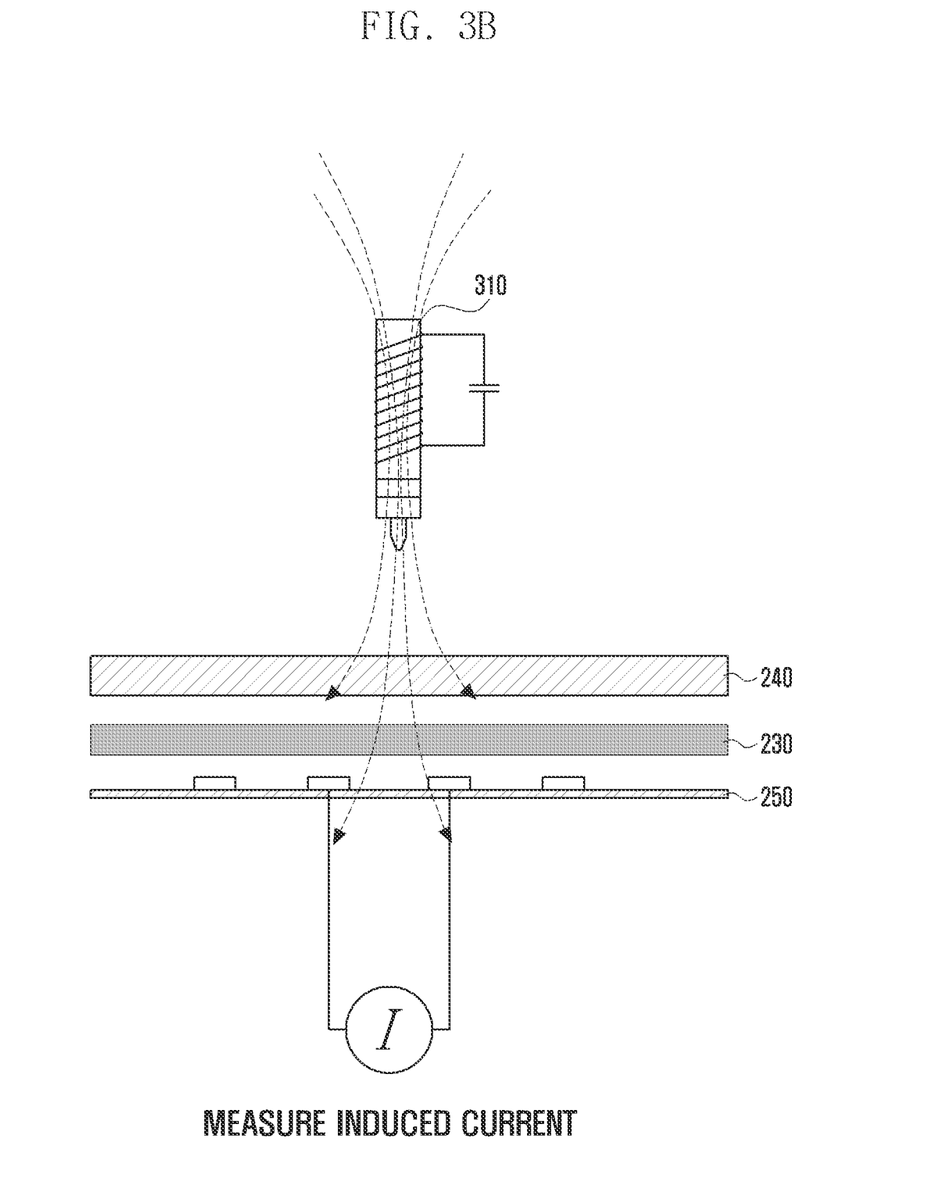

FIGS. 3A and 3B are diagrams illustrating operation of sensing a pen input in a terminal according to an exemplary embodiment of the present invention.

Referring to FIGS. 3A and 3B, the controller 200 applies a current to an FPCB of the EMR panel 250 to generate a resonance, as shown in FIG. 3A, and intercepts an FPCB current and measures an induced current by a resonance remaining in a resonant circuit of a pen 310, as shown in FIG. 3B. The controller 200 determines a touch and a position of the pen 310 with a difference of intensity of a signal input by scanning on a position basis of the EMR panel 250. When a finger is touched, the controller 200 senses a touch through the touch panel 240. Therefore, as shown in FIGS. 3A and 3B, the controller 200 senses a finger touch input and a pen touch input through the respective independently operating touch panel 240 and EMR panel 250, and thus the controller 200 may simultaneously receive two touch inputs.

In this case, when the user holds an EMR pen with a hand and performs a touch action on the display unit 230, a finger/palm holding the pen may be touched, and in this case, the controller 200 senses a pen touch input through the EMR panel 250 and a hand touch input through the touch panel 240. In this case, a hand touch input may be an unnecessary (i.e., unintended) input. However, when a pen touch is input, the user may generate a touch input independent from a pen touch input using a finger. For example, the user may perform a cursive script character input and/or drawing using a pen and simultaneously perform a function of selecting a specific function or correcting a drawn drawing using a hand. Therefore, when the pen touch input is sensed, it is preferable that the controller 200 selectively processes a touch input that is input through the touch panel 240.

Figure 4:
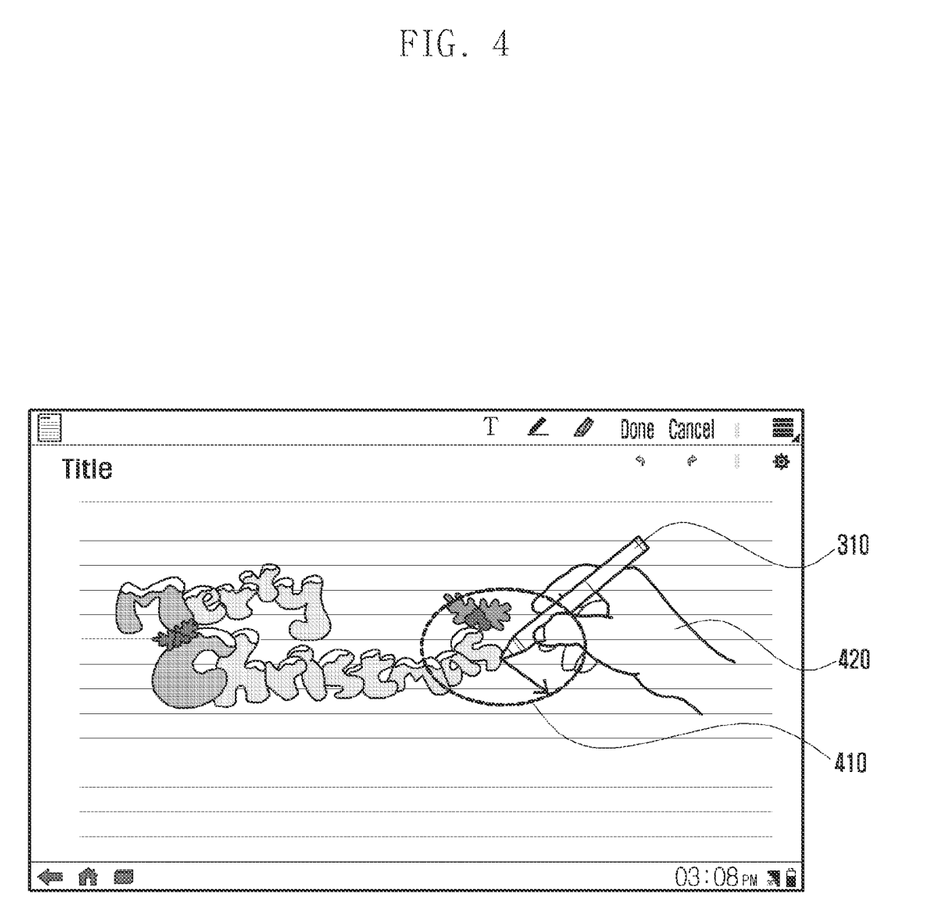
FIG. 4 is a diagram illustrating a method of determining a hand touch input when a pen touch input occurs according to an exemplary embodiment of the present invention.

FIG. 4 is a diagram illustrating a method of determining a hand touch input when a pen touch input occurs according to an exemplary embodiment of the present invention.

Referring to FIG. 4, when a pen touch input is sensed through the EMR panel 250, the controller 200 sets an effective touch area of the touch panel 240 and determines a touch input sensed in the touch panel 240 other than an effective touch area as an ineffective touch input. For this, when the controller 200 senses a touch of the pen 310 through the EMR panel 250, the controller 200 sets a predetermined area of a position at which the pen 310 is touched as an effective touch area 410 of the touch panel 240. In this case, even when a touch input occurs in the touch panel 240 by a hand 420 that holds the pen 310, the input is an input that deviates from a range of the effective touch area 410 of the touch panel 240 and thus the controller 200 ignores the input.

In this case, when the controller 200 sets an effective touch area of the touch panel 240 according to a pen touch input, the controller 200 may set an effective touch area having a predetermined circle form about a pen touch position like the hand 420 of FIG. 4 and set an area in which a user's hand is not touched in the touch panel 240 as an effective touch area according to a user's pen use type.

Figure 5:
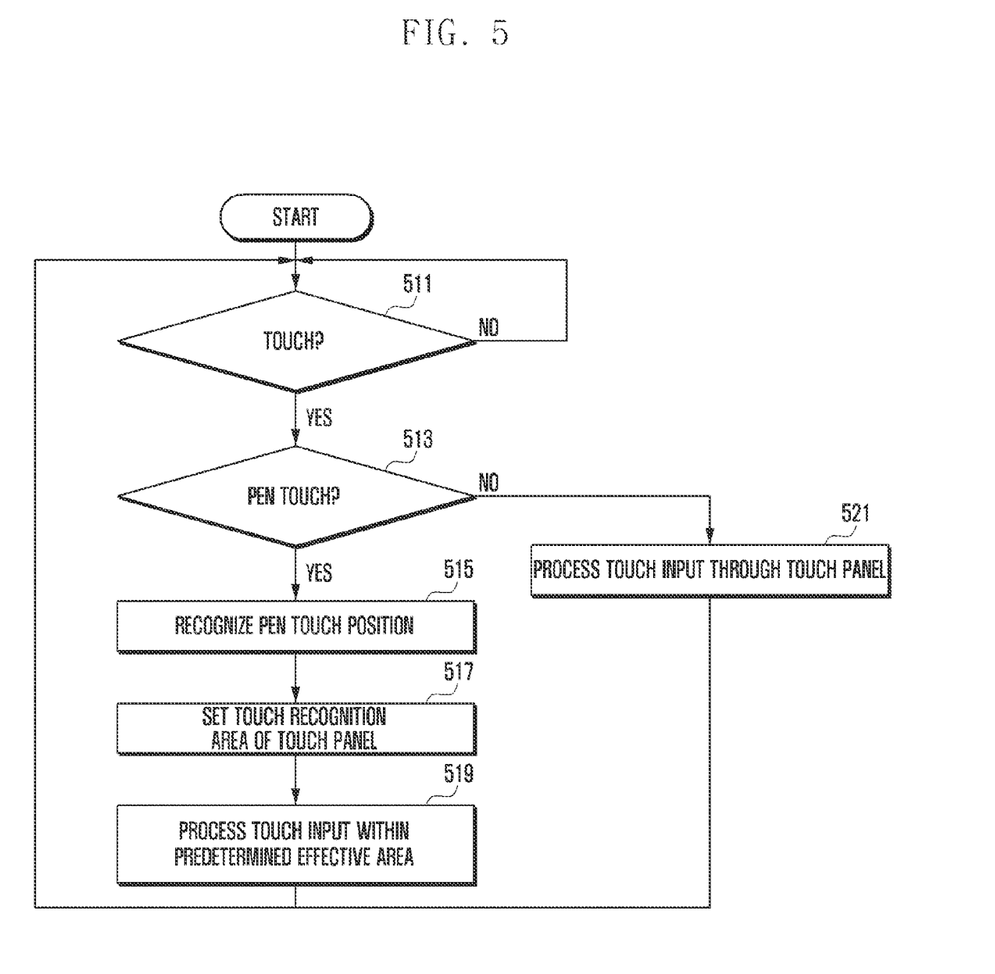
FIG. 5 is a flowchart illustrating a procedure of processing an input to a touch panel when a pen touch input is sensed according to an exemplary embodiment of the present invention.

FIG. 5 is a flowchart illustrating a procedure of processing an input to a touch panel when a pen touch input is sensed according to an exemplary embodiment of the present invention.

Referring to FIG. 5, the controller 200 determines whether a touch input occurs in step 511, and if a touch input occurs, the controller 200 determines whether the touch input is a pen touch input in step 513.

If the touch input is not a pen touch input, i.e., if the touch input is sensed through the touch panel 240, the controller 200 senses the touch input as the pen touch input and processes the pen touch input in step 521.

If the touch input is a pen touch input, the controller 200 senses the pen touch input through the EMR panel 250 and recognizes a position at which the pen touch input has occurred in step 515.

The controller 200 sets an area within a predetermined distance about a position at which the pen touch input is sensed as an effective touch area of the touch panel 240 in step 517. In this case, the controller 200 sets a circular area within a predetermined distance (radius) about the pen touch position as the effective touch area of the touch panel 240, as shown in FIG. 4.

When a touch input is sensed, the controller 200 regards and processes a touch input (finger touch input) sensed within the effective touch area as an effective touch input and regards and ignores touch inputs sensed in an area other than the effective touch area as an ineffective touch input in step 519.

In this case, when the pen touch position is changed (i.e., a pen touch is moved), the controller 200 performs again steps 515 and 517 and sets again an effective touch area of the touch panel 240.

Figure 6:
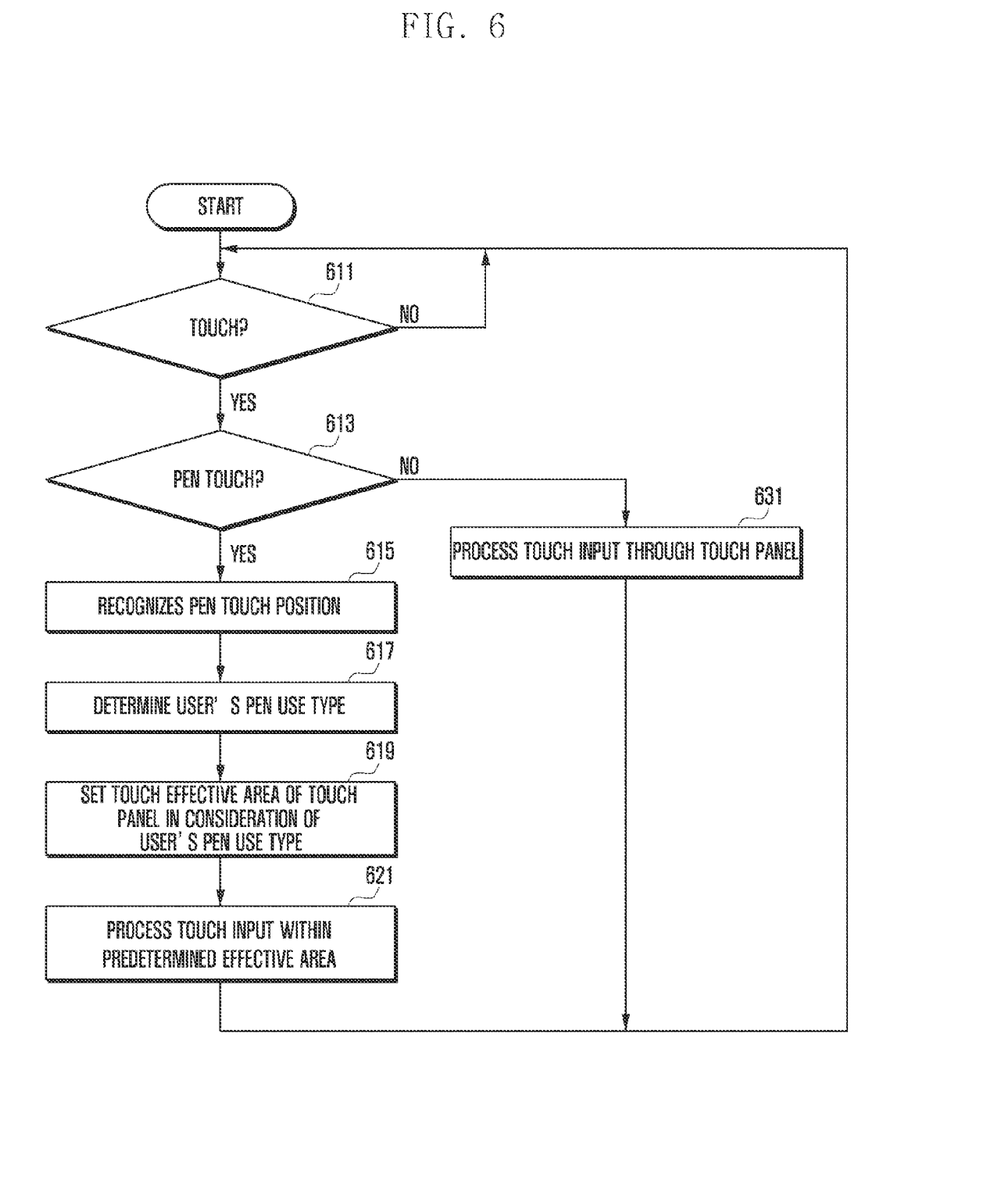
FIG. 6 is a flowchart illustrating a procedure of processing an input of a touch panel when a pen touch input is sensed in a terminal according to an exemplary embodiment of the present invention.
Figure 7:
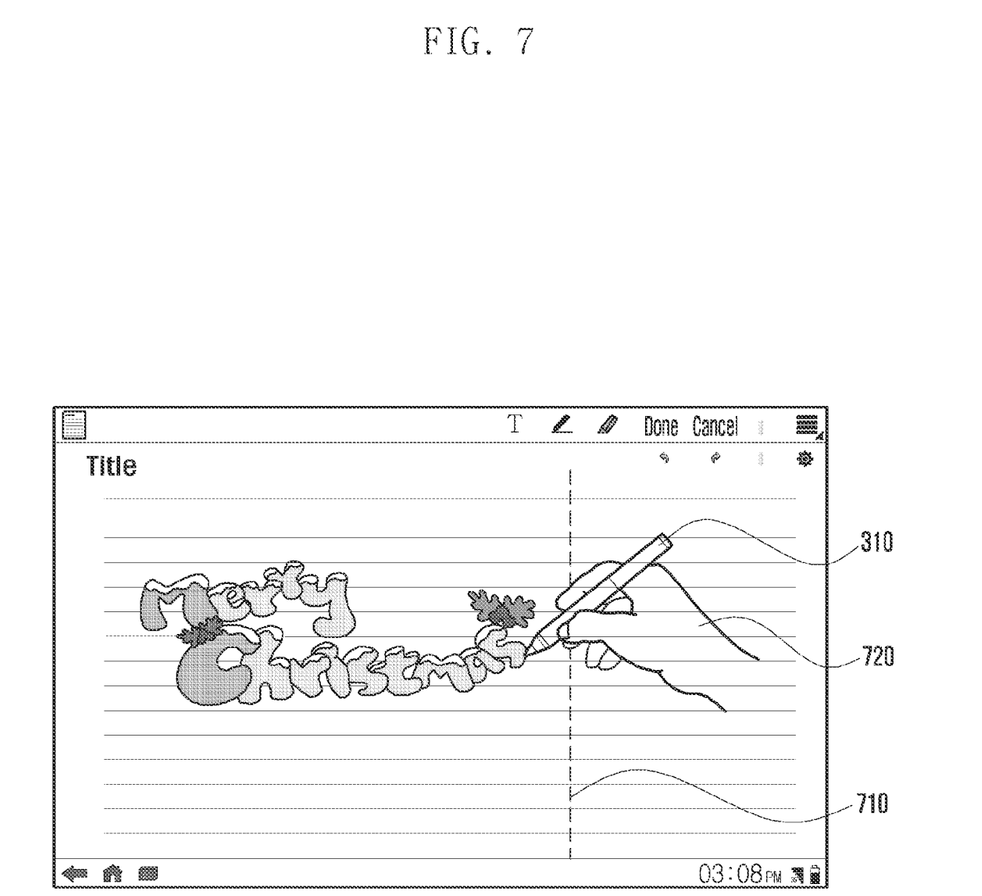
FIG. 7 is a diagram illustrating an example in which a terminal sets an effective touch area of a touch panel by performing an operation of FIG. 6 according to an exemplary embodiment of the present invention.

FIG. 6 is a flowchart illustrating a procedure of processing an input of a touch panel when a pen touch input is sensed in a terminal according to an exemplary embodiment of the present invention, and FIG. 7 is a diagram illustrating an example in which a terminal sets an effective touch area of a touch panel by performing an operation of FIG. 6 according to an exemplary embodiment of the present invention.

Referring to FIG. 6, the controller 200 determines whether a touch input occurs in step 611, and if a touch input occurs, the controller 200 senses the touch input.

The controller 200 determines whether a touch input is a pen touch input in step 613.

If the touch input is not a pen touch input, i.e., if the touch input is sensed through the touch panel 240, the controller 200 senses the touch input as a finger touch input and processes the touch input in step 631.

If a touch input is a pen touch input, the controller 200 recognizes a position at which the pen touch input has occurred through the EMR panel 250 in step 615.

The controller 200 determines a user's pen use type in step 617. Here, the pen use type is to determine whether a hand in which the user uses a pen is a left hand or a right hand. For example, in a left-handed person, a hand is touched at the left side of a pen touch position, and in a right-handed person, a hand is touched at the right side of a pen touch position. Therefore, when an effective touch area of the touch panel 240 is set, it is preferable to determine the right or the left of a pen touch position as an effective touch area according to the user's pen use type. Here, the pen use type may be set in a pen use type registration mode, and when a pen touch is sensed, by analyzing a hand touch input, the user's pen use type may be sensed.

As described above, after a user's pen use type is determined, the controller 200 sets a touch effective area of the touch panel 240 in consideration of the user's pen use type in step 619.

In this case, when the user's pen use type is analyzed, the controller 200 analyzes the user's pen use type and a located direction of the terminal in step 617. For this, when the controller 200 senses a pen touch position, the controller 200 analyzes a direction (right direction and positions of 90°, 180°, and 270°) in which the terminal is located using a sensor (not shown) in addition to the user's pen use type and determines the user's pen use type in step 617.

When the controller 200 senses a pen touch input through the EMR panel 250, the controller 200 determines the user's pen use type as a different direction according to a terminal position. That is, when the terminal is located in 0° direction and 180° direction, a sensed position of the touch panel 240 and the EMR panel 250 is changed. Here, the sensor may be a terrestrial magnetic sensor and/or an acceleration sensor. Therefore, when a pen touch input is sensed, it is preferable that the controller 200 analyzes the user's pen use type and a located direction of the terminal and determines an effective touch area of the touch panel 240.

In this case, the controller 200 sets an area of the touch panel 240, except for a touch position of a hand that holds a pen at a position at which a pen touch input occurs as an effective touch area, as shown in FIG. 7.

FIG. 7 illustrates an example in which a user is a right-handed person 720 and in which a located position of a terminal is a right direction (0° direction) and illustrates an example of setting a left area of the touch panel 240 about reference number 710 as an effective touch area.

As described above, after an effective touch area of the touch panel 240 is set in step 619, if a touch input occurs in a state in which a pen touch input is sensed, the controller 200 regards and processes a touch input (finger touch input) sensed within an effective touch area of the touch panel 240 as an effective touch input in step 621 and regards and ignores touch inputs sensed in an area other than an effective touch area of the touch panel 240 as an ineffective touch input.

In this case, when a position of the pen touch is changed, i.e., when a touch of the pen is moved, the controller 200 performs again steps 615 to 619 and sets again an effective touch area of the touch panel 240.

As described above, according to exemplary embodiments of the present invention, when a pen touch input is sensed in a terminal having a touch panel and an EMR panel, by enabling not to recognize a meaningless touch input by interference of a finger/palm holding a pen, erroneous recognition of an input can be prevented, and by enabling to dispose an icon at even an area in which a palm touches, a more convenient touch panel layout can be available.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of controlling a touch input of a terminal, the method comprising:
   sensing a touch input through a touch panel for sensing a user touch and an Electro Magnetic Resonance (EMR) panel for sensing a pen touch input;
   determining, when the touch input is sensed, a touch position;
   determining, when the touch input is sensed, whether the touch input is a pen touch input;
   setting a partial area of a touch panel comprising the determined touch position as an effective touch area of the touch panel;
   setting the effective touch area of the touch panel and processing, when the user touch input is sensed, the touch input sensed in the effective touch area as an effective touch input; and
   ignoring a touch input in an area not the effective touch area,
   wherein the touch position is determined when the touch input is a pen touch sensed through the EMR panel, and
   wherein the setting of the partial area of the touch panel comprising the determined pen touch position as the effective touch area of the touch panel comprises setting an area within a predetermined radial distance from the pen touch position as an exclusive touch effective area in which a pen touch input is processed as an effective touch input only within the predetermined radial distance.

2. The method of claim 1, wherein the touch effective area comprises a circular area centered within a predetermined distance from the pen touch position.

3. The method of claim 1, wherein the setting of the partial area of the touch panel comprising the determined pen touch position as the effective touch area of the touch panel comprises:
   analyzing a user's pen use type; and
   setting, if the pen use type is a left-handed person, a right area of the pen touch position as the effective touch area, and setting, if the pen use type is a right-handed person, a left area of the pen touch position as the effective touch area.

4. The method of claim 1, wherein the setting of the partial area of the touch panel comprising the determined pen touch position as the effective touch area of the touch panel comprises:
   analyzing a user's pen use type and a located direction of the terminal;
   setting, if the pen use type is a left-handed person, a right area of the pen touch position in a located direction of the terminal as the effective touch area; and
   setting, if the pen use type is a right-handed person, a left area of the pen touch position in a located direction of the terminal as the effective touch area.

5. The method of claim 4, wherein the analyzing of the located direction of the terminal comprises using at least one of a terrestrial magnetic sensor and an acceleration sensor.

6. An apparatus for controlling a touch input of a terminal, the apparatus comprising:
   a touch panel for sensing a user's touch input;
   an Electro Magnetic Resonance (EMR) panel for sensing a pen touch input;
   a controller for determining a touch position when the touch input is sensed and for setting a partial area of the touch panel comprising the determined touch position as an effective touch area of the touch panel; and a display unit for displaying an operation state of the terminal by the control of the controller, wherein the touch input is a pen touch input sensed through the EMR panel, and the controller sets a partial area comprising the determined pen touch position as the effective touch area of the touch panel, wherein the controller sets the effective touch area of the touch panel and processes a touch input sensed in the effective touch area of the touch panel as an effective touch input when the user touch input is sensed, and ignores a touch input in an area not the effective touch area, and wherein the controller sets an area within a predetermined radial distance from the pen touch position as an exclusive touch effective area of the touch panel in which a pen touch input is processed as an effective touch input only within the predetermined radial distance.

7. The apparatus of claim 6, wherein the touch effective area of the touch panel comprises a circular area centered within a predetermined distance from the pen touch position.

8. The apparatus of claim 6, wherein the controller analyzes a user's pen use type, sets a right area of the pen touch position as the effective touch area if the pen use type is a left-handed person, and sets a left area of the pen touch position as the effective touch area if the pen use type is a right-handed person.

9. The apparatus of claim 8, further comprising a sensor for sensing a located direction of the terminal, wherein the controller analyzes the user's pen use type and a located direction of the terminal, sets a right area of the pen touch position in the located direction of the terminal as the effective touch area, if the pen use type is a left-handed person, and sets a left area of the pen touch position in the located direction of the terminal as the effective touch area, if the pen use type is a right-handed person.

10. The apparatus of claim 9, wherein the apparatus has an integral structure in which the touch panel is mounted in an upper portion of the display unit and in which the EMR panel is mounted in a lower portion of the display unit.

11. The apparatus of claim 10, wherein the sensor comprises at least one of a terrestrial magnetic sensor and an acceleration sensor.

* * * * *